INDIUM-GOLD AMALGAMS

Filed July 1, 1955

INVENTOR.
DON G. BURNSIDE
BY J. L. Whittaker
ATTORNEY

United States Patent Office 2,767,085

Patented Oct. 16, 1956

2,767,085

INDIUM-GOLD AMALGAMS

Don G. Burnside, Patrick Air Force Base, Fla., assignor to Radio Corporation of America, a corporation of Delaware Application July 1, 1955, Serial No. 519,569

2 Claims. (Cl. 75—134)

This invention relates generally to improved amalgams and to an improved method for preparing amalgams. More particularly, the invention relates to indium-gold amalgams.

"Amalgam" is a term applied to solutions of metals in liquid mercury. The ability of mercury to dissolve some metals is of considerable importance, as, for example, in the amalgamation process of recovering gold and silver from their ores, in handling certain metals in the field of dentistry, and in forming mirror-like surfaces.

It is an object of this invention to provide an improved amalgam which can be coated onto glass, ceramic, plastic, or semiconductive surfaces to provide a mirror-like finish.

A further object of the invention is to provide an improved amalgam which can be coated onto the surface of a semi-conductor, which amalgam has good electrical conductivity and electrostatic shielding properties.

In the art of making semi-conductive devices it is usually necessary to provide a good ohmic contact upon one or more surfaces of the semi-conductive base material.

Such contacts in the past have generally been made by soldering the electrical leads upon the semi-conductive base. Great care must be used in soldering these leads so as to not excessively heat up and melt the semi-conductive base or near-by lower melting point electrodes such as indium.

It is therefore a further object of this invention to provide an improved amalgam which can readily be applied to a semi-conductive surface to provide a good ohmic contact therewith.

These objects of the invention are accomplished by an indium-gold amalgam. The addition of gold to the indium amalgam results in improved coating in that this amalgam is more fluid and does not streak when brushed upon a surface. Also it was found that, by immersing the metals of the amalgam in ammonium bifluoride prior to the solution thereof in the mercury, the wetting of the solid metals by the mercury was almost instantaneous. Furthermore, the ammonium bifluoride treatment results in an amalgam having a clean bright appearance and of greatly enhanced purity. The amalgam according to the invention consists essentially of 60–65% indium, 10–20% mercury, and 15–30% gold (all by weight).

Figure 1:
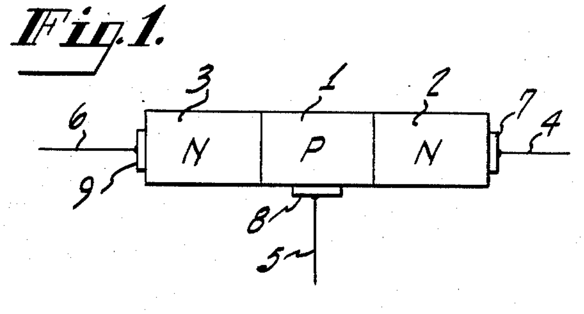
Figure 2:
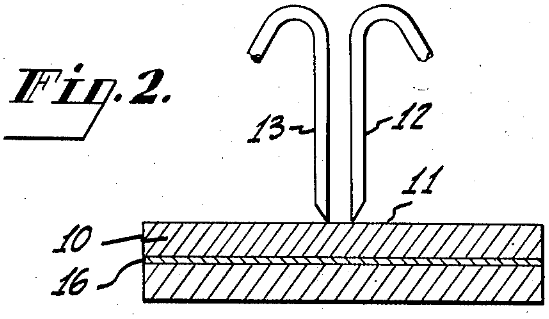

Figure 1 is a schematic, elevational view of a junction-type semi-conductive with ohmic contacts according to the invention; and Figure 2 is a schematic, cross-sectional, elevational view of a point contact semi-conductor device with an ohmic contact according to the invention.

An example of a suitable indium-gold amalgam of the invention consists essentially of 60% by weight of indium with the remainder constituted by equal parts by weight of gold and mercury. This amalgam is semi-plastic and can readily be applied upon any surfaces such as that of a semi-conductive material by brushing, spraying, or dipping. The amalgam coats such other surfaces as glass and ceramic, as well as semi-conductive surfaces, with a mirror-like finish. The amalgam has good electrical conductive and shielding properties. It can readily be applied to semi-conductive bodies such as silicon or germanium at the precise points desired to provide good ohmic contacts, thus eliminating the necessity of soldering techniques and temperatures.

It was discovered that indium-gold amalgams possess all of the advantages of the indium amalgam plus the added advantage that the indium-gold amalgam could be brushed upon a surface without undesirable streaking. This is due to the fact that the gold apparently makes indium amalgam more liquid-like with the consistency of paint, for example. Although this amalgam preferably consists essentially of 60% indium by weight, 20% gold by weight, and 20% mercury by weight, these proportions are not critical. The degree of consistency desired determines the proportion of gold to be employed. The greater the proportion of gold, the greater the consistency. Other workable amalgams having the following proportions are:

| | Example A | Example B | Example C | Example D |
|---|---|---|---|---|
| Indium | 65 | 60 | 60 | 65 |
| Gold | 15 | 25 | 30 | 25 |
| Mercury | 20 | 15 | 10 | 10 |

Normally the amalgamation process occurs by the gradual wetting of the solid metal or metals by the mercury. Surface conditions of the metals determine to a considerable extent the degree of impurity and hence non-uniformity of the amalgam as well as the rapidity of the wetting. Unexpectedly it has been found that if the metals to be amalgamated, i. e., indium and gold, are first immersed in a solution of ammonium bifluoride, that the wetting of the entire surface of the solid metals by the mercury is almost instantaneous. The resulting amalgam has a clean bright appearance.

The invention is of particular advantage in providing ohmic contacts for semi-conductive devices. It is necessary for successful operation to assure that the leads be attached to the semi-conductive bodies in a manner not resulting in rectification. One such device is shown in Figure 1 which is a junction transistor comprising a single crystal sandwich of n and p-type conductivity germanium. As shown in this figure, a p-type germanium region 1 is contained between n-type germanium regions 2 and 3. The conductivity types are established, as is well known, by suitably doping the germanium as with arsenic for n-type and indium for p-type. The arrangement of the conductivity types can be altered, of course, so as to provide n-p-n devices. In the device of Figure 1 the p-type region 1 serves as the base, the n-type region 2 as the emitter, and the n-type region 3 as the collector. Electrical connections 4, 5, and 6 must be attached to the regions ohmically, that is without rectification occurring at the point of connection. Such ohmic contacts are provided on these regions by brushing an amalgam of indium and gold according to the invention on the regions where the contacts are to be made. Actually, the ohmic contact layers 7, 8 and 9 are very thin although shown in the figure of greatly exaggerated thickness for the purpose of illustration. The leads 4, 5, and 6 are then contacted to these amalgam layers to make the necessary electrical connections to the device.

Figure 2 shows a point contact transistor suitable for high frequency operation. This transistor comprises a base wafer 10 of n-type germanium, which is arsenic-doped, for example. Upon the upper surface 11 of the wafer are pressed two closely spaced relatively hard, pointed metallic wires 12 and 13. The ends of these wires are sharpened to chisel points so that the areas of contact between the wafer and the wires are minimized. The ends of the wires contact the wafer at two points 0.005 inch apart. One of the wires, for example 12, may be advantageously employed in a circuit as an emitter electrode, the other wire, for example 13, as a collector electrode. An electrical lead 14, which may conveniently serve as a base connection, is contacted to the lower surface 15 of the wafer 10 so as to provide non-rectifying connection thereto by means of a thin layer 16 of indium-gold amalgam according to the invention.

There thus has been described an improved amalgam which can be applied, as by brushing, upon surfaces with a mirror-like finish. Furthermore, the amalgam of the invention is a good electrical conductor and may be used to form electrostatic shields as on glass or ceramic and as a good ohmic contact upon the semi-conductive body of devices. Furthermore, the method of the invention considerably speeds up the amalgamation process and results in a purer, more adherent amalgam.

What is claimed is:

1. An amalgam consisting essentially of 60–65% by weight of indium, 10–20% by weight of mercury, and 15–30% by weight of gold.

2. An amalgam consisting of 60% by weight of indium, 20% by weight of gold, and 20% by weight of mercury.

References Cited in the file of this patent

UNITED STATES PATENTS

| | | |
|---|---|---|
| 1,243,062 | Halvorsen | Oct. 16, 1917 |
| 1,863,254 | Polin | June 14, 1932 |
| 1,959,668 | Gray | May 22, 1934 |
| 2,649,368 | Smith et al. | Aug. 18, 1953 |
| 2,680,071 | Epstein | June 1, 1954 |
| 2,721,965 | Hall | Oct. 25, 1955 |
| 2,725,315 | Fuller | Nov. 29, 1955 |